(12) United States Patent
Haggai et al.

(10) Patent No.: US 12,324,043 B2
(45) Date of Patent: Jun. 3, 2025

(54) METHODS AND DEVICES FOR CONNECTION RETRY AFTER FAILED CONNECTION ATTEMPT IN WIRELESS SYSTEMS

(71) Applicant: Intel Corporation, Santa Clara, CA (US)

(72) Inventors: Oren Haggai, Kefar Sava (IL); Chandra Sekhar U, Bangalore (IN); Manohar B V., Bangalore (IN); Anubhav David, Berhampur (IN); Subbiah Ramakrishnan, Madurai (IN); Karthik Malurpatna Chamaraj, San Jose, CA (US); Hakan Magnus Eriksson, Portland, OR (US); Adiel Shaul, Sha'arei Tikva (IL)

(73) Assignee: Intel Corporation, Santa Clara, CA (US)

( * ) Notice: Subject to any disclaimer, the term of this patent is extended or adjusted under 35 U.S.C. 154(b) by 675 days.

(21) Appl. No.: 17/536,132

(22) Filed: Nov. 29, 2021

(65) Prior Publication Data
US 2023/0171833 A1 Jun. 1, 2023

(51) Int. Cl.
*H04W 76/25* (2018.01)
*H04W 4/80* (2018.01)
*H04W 76/14* (2018.01)
*H04W 76/18* (2018.01)

(52) U.S. Cl.
CPC ............. *H04W 76/18* (2018.02); *H04W 4/80* (2018.02); *H04W 76/14* (2018.02)

(58) Field of Classification Search
CPC ....... H04W 76/18; H04W 4/80; H04W 76/14; H04W 76/25; H04W 84/18
See application file for complete search history.

(56) References Cited

U.S. PATENT DOCUMENTS

| 11,452,110 | B1 * | 9/2022 | Jorgovanovic | H04W 72/1215 |
| 11,696,356 | B2 * | 7/2023 | Kim | H04W 76/18 455/456.1 |
| 2010/0081447 | A1 * | 4/2010 | Qi | H04W 72/541 370/329 |
| 2012/0257604 | A1 * | 10/2012 | Honkanen | H04W 76/14 370/338 |

(Continued)

OTHER PUBLICATIONS

European Search Report issued for the corresponding European patent application No. 22199511, dated Apr. 18, 2023, 12 pages (for informational purposes only).
(Continued)

*Primary Examiner* — Cindy Trandai
(74) *Attorney, Agent, or Firm* — Viering, Jentschura & Partner mbB

(57) ABSTRACT

The present disclosure provides a controller configured to detect a reconnection single point of failure in a Bluetooth or other Low-Energy wireless connection attempt with a peripheral device and implement a procedure to reconnect with the peripheral device by delaying the reporting of the connection failure to a host processor. Instead, the controller initiates an additional scan on a different frequency band than used in the initial attempt in a further attempt at connecting with the peripheral device.

20 Claims, 8 Drawing Sheets

(56) References Cited

U.S. PATENT DOCUMENTS

| | | | |
|---|---|---|---|
| 2013/0326495 A1* | 12/2013 | Reunamaki | G06F 8/65 |
| | | | 717/173 |
| 2015/0109897 A1* | 4/2015 | Lee | H04W 4/80 |
| | | | 370/312 |
| 2015/0230285 A1 | 8/2015 | Park et al. | |
| 2017/0034646 A1 | 2/2017 | Song | |
| 2017/0078836 A1* | 3/2017 | Song | H04W 8/005 |
| 2018/0095712 A1* | 4/2018 | Iinuma | G06F 3/1454 |
| 2018/0116004 A1* | 4/2018 | Britt | H04W 28/0263 |
| 2019/0171991 A1* | 6/2019 | Bastide | G06Q 10/06395 |
| 2019/0320309 A1* | 10/2019 | Carlson | H04L 67/141 |
| 2020/0053831 A1* | 2/2020 | Park | H04W 80/02 |
| 2021/0029761 A1* | 1/2021 | Jung | H04W 72/02 |
| 2021/0119904 A1* | 4/2021 | Yu | H04L 45/28 |
| 2021/0282207 A1* | 9/2021 | Cheong | H04W 4/80 |
| 2023/0119150 A1* | 4/2023 | Yehezkely | H04W 72/0453 |
| | | | 455/41.1 |
| 2023/0171579 A1* | 6/2023 | Stridkvist | H04W 8/005 |
| | | | 370/329 |
| 2024/0421849 A1* | 12/2024 | Wilhelmsson | H04B 1/715 |

OTHER PUBLICATIONS

Gupta, Naresh, "Inside Bluetooth Low Energy", 2013, 274 pages, Artech House, ISBN-13: 978-1-60807-579-9.

* cited by examiner

502 — Transmitting a connection indication message to a peripheral device and a connection complete event message to a host in response to receiving an advertising message from the peripheral device on a first frequency band 504 — Transmitting a plurality of data packets to the peripheral device after the connection indication message 506 — Based on receiving no response from the peripheral device in response to the plurality of data packets, re-attempting a connection with the peripheral device including: initiating a scan of a second frequency band for a further advertising message from the peripheral device; and transmitting a second connection indication message to the peripheral device based on receiving the further advertising message on the second frequency band

METHODS AND DEVICES FOR CONNECTION RETRY AFTER FAILED CONNECTION ATTEMPT IN WIRELESS SYSTEMS

TECHNICAL FIELD

This disclosure generally relates to the field of wireless communications.

BACKGROUND

In Bluetooth (BT) Low-Energy (LE) systems, user devices such as mobile phones, tablets, or personal computers (PCs) may be configured to pair with peripheral devices such as mouses, keyboards, game controllers, headphones, or other Human Interface Devices (HIDs). The peripheral devices may then be turned off or exit the range of the user device, and later be turned back on or re-enter the range of the user device. The peripheral device will try to automatically reconnect to the user device by first sending out advertising messages while the user device scans for the advertising messages. After receiving an advertising message, the user device will send a connection indication message to the peripheral device to establish a connection. During this procedure, however, the peripheral device may fail to receive the connection indication message (CONN_IND) from the user device. Since the procedure of sending the CONN_IND does not include a feedback message, the user device will move to a connection state while the peripheral device, which missed the CONN_IND, remains in an advertising state. Eventually, the user device's connection with the peripheral device will time out. The present disclosure refers to such an event as a "reconnection single point of failure."

The present disclosure provides a mechanism to detect the reconnection single point of failure in the controller firmware at the user device side and attempt to reconnect to the peripheral device without having to report the connection failure to the host and reinitiating the reconnection procedure from the beginning after a time-out. By implementing the techniques described herein, the present disclosure is able to reduce reconnection delays from seconds to milliseconds.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the description, various aspects of the disclosure are described with reference to the following drawings, in which:

FIG. 5 exemplarily shows a flowchart detailing a method according to the present disclosure;

DESCRIPTION

The following detailed description refers to the accompanying drawings that show, by way of illustration, specific details, and aspects in which the disclosure may be practiced.

Figure 1:
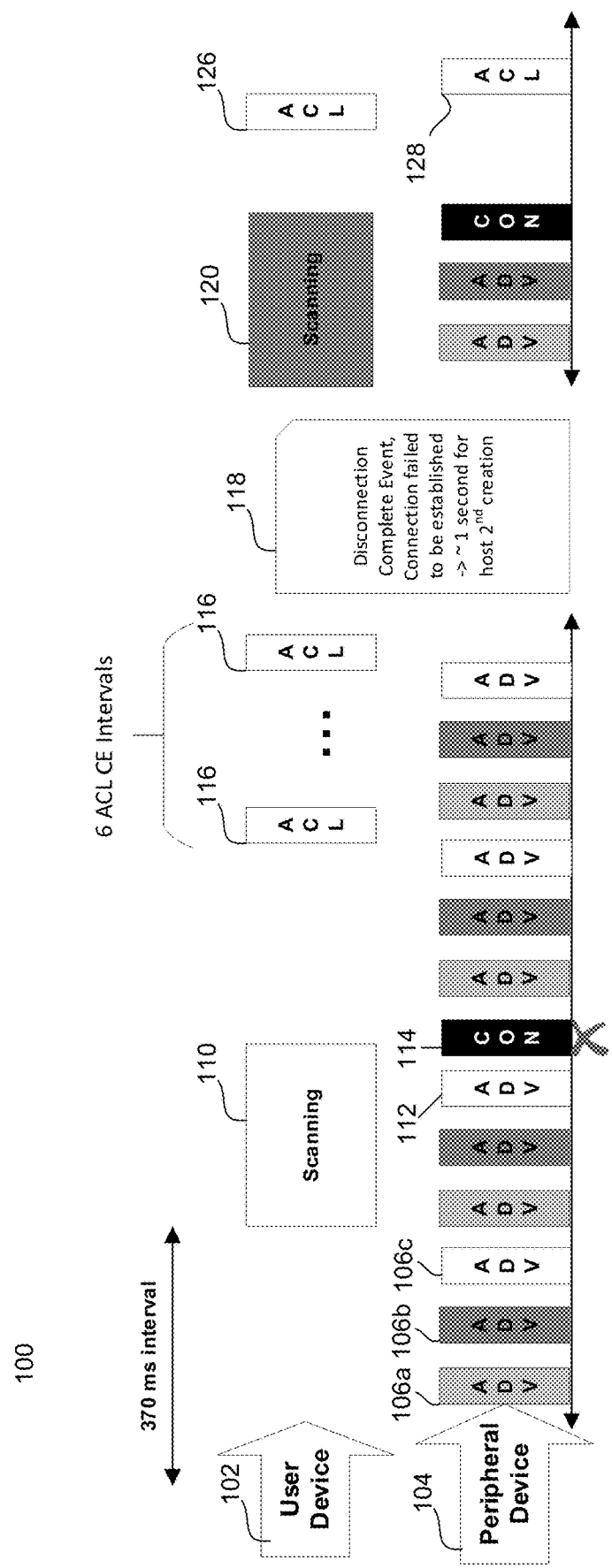
FIG. 1 exemplarily shows a reconnection single point of failure scenario according to the present disclosure.

FIG. 1 is a time diagram 100 illustrating a reconnection single point of failure according to the present disclosure. It is appreciated that diagram 100 is exemplary in nature and may thus be simplified for purposes of this explanation. For exemplary purposes, the user device 102 may be a PC and the peripheral device 104 may be a BT-enabled mouse.

The reconnection procedure takes place with the peripheral device 104 sending advertising messages (ADV) to solicit a connection with a user device 102. The peripheral device 104 transmits the advertising messages (ADV) on three different channels. The three different channels are illustrated by the three different colors of shading (light shading 106a, darker shading 106b, and no shading 106c) on the ADV blocks in diagram 100. The three channels are Channel 37 (corresponding to 2402 MHz), Channel 38 (corresponding to 2426 MHz), and Channel 39 (corresponding to 2480 MHz). For example, the ADV blocks with lighter shading such as ADV 106a may correspond to Channel 37, the ADV blocks with darker shading such as ADV 106b may correspond to Channel 38, and the ADV blocks with no shading such as ADV 106c may correspond to Channel 39.

The user device 102 scans in the background according to the timing established by Bluetooth protocols and scans any one of the three channels that the peripheral device 104 advertises on. The scanning is duty cycle based and may include periods of continuous scanning on a given channel. For example, in 110, the user device is scanning on Channel 39 (corresponding to ADV blocks with no shading such as ADV 106c).

When the user device 102 is scanning 110 on Channel 39, it may successfully receive ADV 112 (on Channel 39, similar to ADV 106c) and respond with transmitting a connection indication message (CONN_IND or CON) 114 to the peripheral device 104. The user device 102 then commences to begin a connection with the peripheral device 104 using the parameters it sent in the connection indication message, CON 114.

However, the procedure of sending the CONN_IND does not include a feedback message to alert the user device 102 that it was successfully received. It is possible that the peripheral device failed to receive the CONN_IND from the user device 102 due to noise (RF interference) or other factors. This is especially true in congested environments since peripheral devices use three primary advertising channels which may experience collisions with other RF traffic. In this scenario, the user device 102 is unaware that the CONN_IND 114 was not received by the peripheral device 104 and moves to a CONNECTION state even though the peripheral device 104 remains in the ADVERTISING state (i.e., continues to transmit ADV messages).

In the CONNECTION state, the BT controller of the user device 102 will report that the connection was successful to the operating system (OS) host stack (as per Bluetooth standards) of the user device 102 and attempt to send packets on the new connection to the peripheral device 104. The data packets send by the user device 102 may be Asynchronous Connection-Less (ACL) data packets 116, which are sent out over 6 ACL Connection Event (CE) time intervals (only two shown in diagram 100). However, since the peripheral device 104 remains in the ADVERTISING state, it will not receive these ACL packets 116. After the user device 102 receives no response to its ACL packets 116 from the peripheral device 104, a connection timeout is reported from the BT controller to the OS host stack in the form of a disconnection event message 118. After this, the host may re-initiate an attempt to connect to the peripheral device, but this will result in a long turnaround time. The user device may attempt to reconnect again if the problem persists, resulting in additional delays. These delays cause a bad user experience and bad responsiveness when peripheral devices try to reconnect to user devices in a congested environment.

The blocks to the right of 118 illustrate a successful connection event, where the user device receives the ADV message on Channel 38 during its scan 120, and the peripheral device successfully receives the CONN_IND (CON) message. Upon successful receipt of the CON message, the peripheral device 104 switches to a receive mode to receives the ACL packet(s) transmitted by the user device 126 and responds with ACL packets of its own 128.

As shown in diagram 100, the user device may experience delays in reconnecting to peripheral devices in congested environments due to connect/disconnect loops and high turnaround time between host OS stack and BT controller firmware. The reconnection single point of failure was previously handled by longer connection times and caused delays to the user. The previous solutions, such as those described above with respect to FIG. 1, are relying on the Host OS to manage the reconnection attempts, which results in multiple Host/Controller reconnection attempts, and leads to larger delays and bad user experience. The delay overhead in such scenarios has been measured at least in the range of 2 to 4 seconds.

The present disclosure adds a host offload mechanism to detect the single point of failure in the BT controller firmware. In this manner, the BT controller firmware can attempt to reconnect with the peripheral device without having to report the connection failure to the host immediately.

In the description above with respect to FIG. 1 and in the ensuing description, example scenarios may use a user device and a peripheral device to illustrate the concepts of the present disclosure in dealing with reconnection. It is appreciated that this is exemplary in nature and may apply to include solutions in the BT space such as reconnection between a laptop/PC and a mouse, keyboard, or speakers, for example, or between a mobile phone and a watch, for example. Additionally, in later application spaces, LE reconnection may often take place in a congested RF environment. Implementation of the present disclosure can significantly improve the user experience and responsiveness of the application. The details of the present disclosure described herein are intended to apply to any reconnection attempt, coming from any Host Bluetooth application profile.

Advantages of the present disclosure include faster reconnection response time for LE devices such as peripheral devices even in congested environments, which directly results in better user experience. Additionally, the present disclosure does not require any changes to the peripheral device side advertising behavior. In this manner, the present disclosure will work with all existing LE peripheral devices. Also, the present disclosure is backwards compatible with the existing LE connection setup while complementing it with the prevention from the reconnection single point of failure. Furthermore, the present disclosure is power efficient and saves power by offloading the reconnection attempts from the Host/Application processor to the BT controller, which avoids interrupting the Host Processor (e.g., Host CPU) in a congested environment. The reconnection power peak is therefore reduced as the connection time is diminished and contained within the BT controller.

Figure 2:
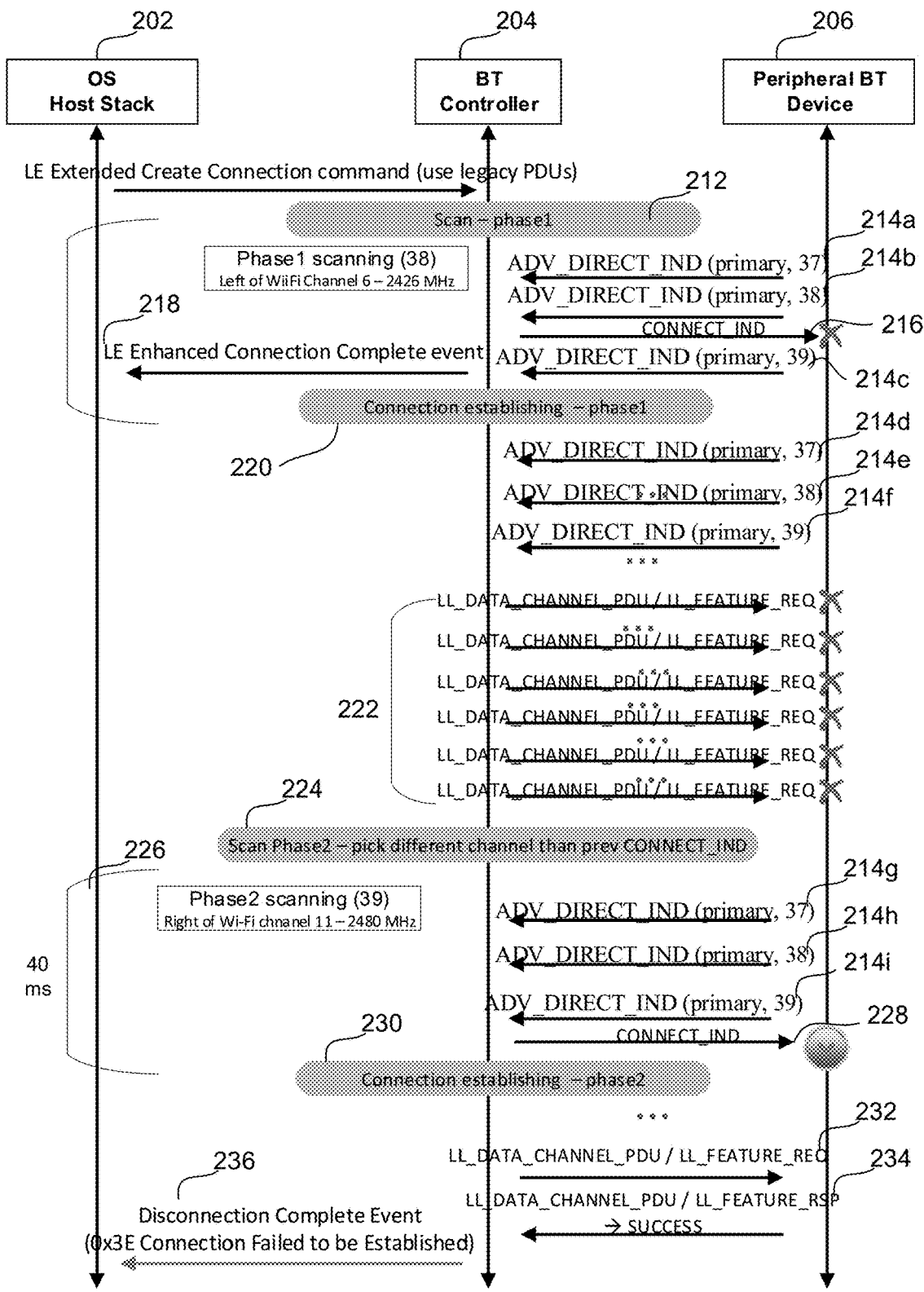
FIG. 2 exemplarily shows a message sequence chart (MSC) for preventing a reconnection single point of failure according to the present disclosure.

FIG. 2 shows a message sequence chart (MSC) 200 illustrating a mechanism for preventing a reconnection single point of failure according to the present disclosure. It is appreciated that MSC 200 is exemplary in nature and may therefore be simplified for purposes of this explanation.

MSC 200 includes messaging between an OS Host Stack 202, a BT controller 204, and a peripheral BT device 206. OS Host Stack may be included in the Application Processor of a user device also housing BT controller 204. In other words, OS Host Stack 202 and BT Controller 204 may each be a combination of hardware and/or software processing components of a user device such as a laptop, PC, mobile phone, tablet, etc. Peripheral BT device 206 may be any BT enabled device that may pair with the user device. Examples include a keyboard, a mouse, a game controller, a watch or other wearable device, a headset, headphones, etc.

The reconnection procedure commences when the BT Controller 204 receives the LE Extended Connection Command 210 from the OS Host Stack 202. This command may be transmitted using legacy Packet Data Units (PDUs). After receiving this command, the BT controller 204 initiates the Phase 1 Scan 212. In this example, the Phase 1 Scan 212 is performed on Channel 38 (2426 MHz). This channel is just left of the Wi-Fi Channel 6.

While the BT controller 204 is performing the Phase 1 Scan 212 on Channel 38, the peripheral BT device 206 is transmitting advertising messages on the three BT advertising channels, i.e., Channels 37, 38, and 39. For example, the peripheral BT device 204 transmits the first advertising message (ADV_DIRECT_IND (primary, 37)) 214*a* on Channel 37 and a second advertising message (ADV_DIRECT_IND (primary, 38)) 214*b* on Channel 38.

Since the BT controller 204 is scanning on Channel 38 during this period, the BT controller 204 receives advertising message 214*b* on Channel 38 and responds by transmitting a connection indication (CONNECT_IND) message 216 to the peripheral BT device 206 on Channel 38 and a connection complete message (LE Enhanced Connection Complete event) 218 to the OS Host Stack 202. This connection complete message 218 may include information as required by the BT technical specifications.

Next, the BT Controller 204 will attempt to establish a connection 220 resulting from the phase 1 scan. Since the peripheral BT device 206 never successfully received the CONNECT_IND 216, however, it continues to send advertising messages in 214*c*-214*f*. Believing it has successfully established a connection with peripheral BT device 206 due to the transmission of the CONNECT_IND message 216 and the connection complete event message 218 to the OS Host Stack 202, BT controller 204 transmits the six ACL data packets 222 in the Connection Event (CE) anchors (LL_DATA_CHANNEL_PDU/LL_FEATURE_REQ). However, since the peripheral BT device 206 continues in the advertising state, it does not receive the ACL data packets 222.

If the BT Controller 204 fails to receive a response to any or all of the ACL data packets 222, the present disclosure implements a mechanism to re-attempt a connection with the peripheral device before reporting a connection failure to the host stack. In this manner, rather than immediately reporting the disconnection complete event to the OS Host Stack, the BT controller proceeds to initiate a phase 2 scan.

In other words, according to the present disclosure, the BT controller 204 is configured to postpone the transmission of a disconnection complete message with error code 0x3E (Connection Failed to be established) to the OS Host Stack 202. Instead, the BT controller 204 initiates a phase 2 scan 224 on a different frequency channel than used in phase 1.

The selection of the channel to use in the phase 2 scan (or any subsequent scan) may be based on a larger distance rule than the channel used in the phase 1 scan (or the preceding scan). For example, if Channel 37 (2402 MHz) was used in the phase 1 scan, then Channel 39 (2480 MHz) is used for the phase 2 scan (and vice versa). In case the middle channel was used in the phase 1 scan (i.e., Channel 38 at 2426 MHz), then Channel 39 (2480 MHz) is selected for the phase 2 scan. This selection avoids using Channel 38 (2426 MHz) for phase 2 scanning (or any subsequent scan) since Channel 38 is the closest to Wi-Fi channel 6 (at 2438 MHz) that is commonly used by Wi-Fi Access Points as the default low-band channel. Table 1 below summarizes what channel the BT Controller 206 may select for the phase 2 scan (or any subsequent scan) based on the phase 1 scan (or the preceding scan). By implementing this selection process, the BT controller 206 is able to increase the likelihood that the phase 2 scan will result in a successful connection with the peripheral device.

TABLE 1

| Phase 1 Scan | Phase 2 Scan |
|---|---|
| 37 (2402 MHz) | 39 (2480 MHz) |
| 38 (2426 MHz) | 39 (2480 MHz) |
| 39 (2480 MHz) | 37 (2402 MHz) |

In addition to implementing the phase 2 scan, the BT controller 206 may initiate a timer 226 providing a duration for performing the phase 2 scan. In this example, a time of 40 ms is used, but it is appreciated that the duration of the timer may be scalable to other durations based on system or network considerations.

In the scenario illustrated by MSC 200, Channel 39 is selected for the phase 2 scan 224 as outlined above in Table 1.

During this process, the peripheral BT device 206 continues to transmit advertising messages on the three advertising channels (i.e., Channels 37, 38, and 39) 214g-214l. BT controller 206 receives the Channel 39 advertising message 214i since it is performing the phase 2 scan on Channel 39 and responds with a connection indication message (CONNECT_IND) on Channel 39 228. In this scenario, the peripheral BT device 206 successfully receives CONNECT_IND 228 on channel 39, and thus switches from the advertising state to wait for the ACL data packets from the BT controller 204. After transmitting the CONNECT_IND 228 on Channel 39, the BT controller then is configured to transmit the $1^{st}$ to $6^{th}$ phase ACL data packets in the phase 2 CE anchors 232 (only one packet shown). The BT controller 206 then waits for the peripheral device response, which it receives in 234 (LL_DATA_CHANNEL_PDU/LL_FEATURE_RSP→SUCCESS). Accordingly, the present disclosure allows for a successful connection retry attempt between BT controller 204 and peripheral BT device 206 after a reconnection single point of failure by (1) delaying the reporting of a disconnection complete event message to the host stack after an initial connection time out and (2) implementing a phase 2 scan on a different channel than used in the phase 1 scan.

In the event that the BT controller 204 did not receive an ACL response 234 from the peripheral BT device 206 for any of the $1^{st}$ to $6^{th}$ ACL data packets 232 (only one shown) or if the timer 226 expired before receiving any advertising messages from the peripheral BT device 206, the BT controller 204 may then finally report the Disconnection Complete Event (0x3E Connection Failed to be Established) 236 to the OS Host Stack 202.

The sequence shown by MSC 200 allows the prevention of a round trip of disconnection complete to host and another connection request by human-computer interaction (HCI) by scanning in a different RF channel and sending CONNECT_IND in a channel with higher success probability than the previous RF channel.

The sequence of phase2 scanning described in MSC 200 is shown once for prevention of reconnection single point of failure. As a general implementation, the phase 2 scanning may be repeated more than once and up to a given threshold to increase the connection success probability, beyond the first order retry, which is shown in FIG. 2. When advertising channels are more noisy, multiple attempts will increase the chance to switch to CONNECTION state with more data channels which are more reliable and higher in number than the advertising channels.

Figure 3:
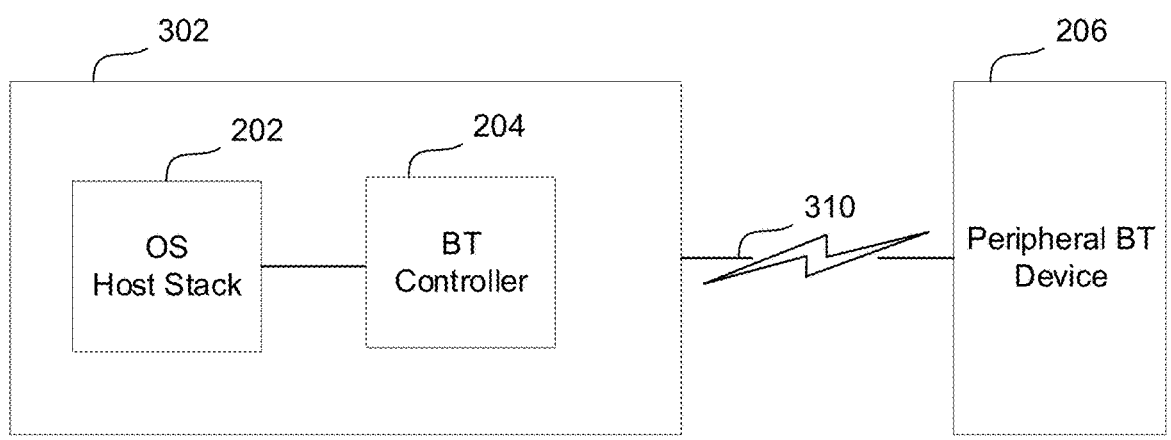
FIG. 3 exemplarily shows a diagram of device communication according to the present disclosure.

FIG. 3 shows a device communication arrangement 300 associated with FIG. 2. The user device 300 may be a terminal device such as a laptop, PC, tablet, mobile phone, etc. and may include an Application Processor 202 for the OS Host Stack and a BT Controller 204 configured to implement the BT mechanisms of the present disclosure while adhering to the BT technical specifications and protocols. Peripheral BT device 206 may be any other BT-enabled device capable of establishing a BT connection with user device 302 and may include another laptop, PC, tablet, mobile phone, keyboard, mouse, speakers, headphone, headset, game controller, wearable device (e.g., watch), etc. BT controller 204 may be implemented by hardware (e.g., one or more processors) and/or software.

As shown in device communication arrangement 300, a BT wireless link 310 may be established between user device 302 and peripheral BT device 206 and may serve to provide BT communications in either direction.

Figure 4:
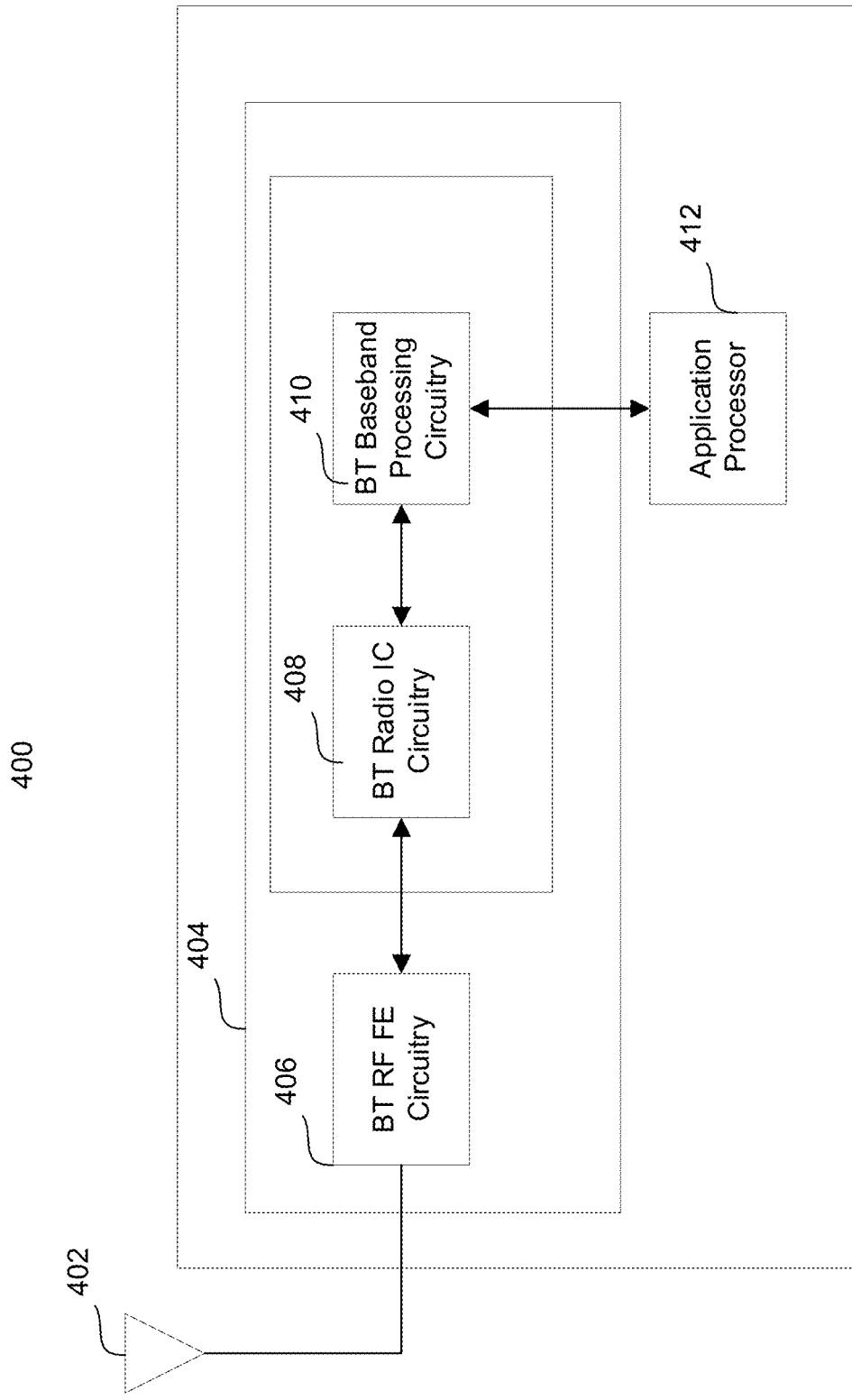
FIG. 4 exemplarily shows a schematic diagram of wireless components according to the present disclosure.

FIG. 4 shows a block diagram of a radio device architecture 400 in accordance with the present disclosure. Radio device architecture 400 may include an antenna 402, a BT circuit card 404 (or BT Controller) with BT radio frequency (RF) front-end (FE) circuitry 406, BT radio integrated circuit (IC) circuitry 408, and BT Baseband Processing Circuitry 410. BT Baseband Processing Circuitry 410 may interface with Application Processor 412. It is appreciated that FIG. 4 is exemplary in nature and intended to illustrate components related to the present disclosure, and, accordingly, other components may be omitted for purposes of this explanation.

BT RF FE circuitry 406 may include a receive signal path which may include circuitry configured to operate on BT RF signals received from one or more antennas 402, to amplify the received signals, and to provide the amplified versions of the received signals to the BT radio IC circuitry 408 for further processing. BT RF FE circuitry 406 may also include a transmit signal path which may include circuitry configured to amplify BT signals provided by the BT Radio IC circuitry 408 for wireless transmission by one or more of the antennas 402.

BT Radio IC circuitry 408 may include a receive signal path which may include circuitry to down-convert BT RF signals received from the BT RF FE circuitry 406 and provide baseband signals to BT baseband processing circuitry 410. BT radio IC circuitry 408 may include a transmit signal path which may include circuitry to up-convert BT baseband signals provided by the BT baseband processing circuitry 410 and provide BT RF output signals to the BT FR FE circuitry 406 for subsequent wireless transmission by the one or more antennas 402.

BT baseband processing circuitry 410 may include a memory. BT baseband circuitry 410 may further include one or more processors and/or control logic to process the signals received from the corresponding BT receive signal path of the BT Radio IC circuitry 408, and to also generate corresponding BT baseband signals for the transmit signal path of the BT Radio IC circuitry 408. BT baseband processing circuitry 410 may further include physical layer (PHY) and medium access control layer (MAC) circuitry and may further interface with Application Processor 412 for generation and processing of the baseband signals and for controlling operations of the BT Radio IC circuitry 408. The Application Processor 412 may also be referred to as a Host Processor and include the OS Host Stack.

BT baseband circuitry 410 may be compliant with a Bluetooth (BT) connectivity standard such as Bluetooth, Bluetooth 4.0 or Bluetooth 5.0, or any other iteration of the Bluetooth Standard. Radio device 400 may be configured to establish a BT synchronous connection oriented (SCO) link and/or a BT low energy (BT LE) link. Radio device architecture 400 may be configured to establish an extended SCO (eSCO) link for BT communications and be configured to engage in a BT Asynchronous Connection-Less (ACL) communications such as those described herein.

The functions of a BT circuit card 404 may be combined with a wide local area network (WLAN) radio card on a single wireless radio card. In some aspects, radio device 400 may include other radio cards, such as a cellular radio card configured for cellular (e.g., 3GPP such as LTE, LTE-Advanced, or 5G communications).

FIG. 5 shows a flowchart 500 illustrating reconnection method according to aspects of the present disclosure. It is appreciated that flowchart 500 is exemplary in nature and may thus be simplified for purposes of this explanation.

The method may include transmitting a connection indication message to a peripheral device and a connection complete event message to a host in response to receiving an advertising message from the peripheral device on a first frequency band 502.

The method may further include transmitting a plurality of data packets to the peripheral device after the connection indication message 504.

The method may further include, based on receiving no response from the peripheral device in response to the plurality of data packets, re-attempting a connection with the peripheral device including initiating a scan of a second frequency band for a further advertising message from the peripheral device; and transmitting a second connection indication message to the peripheral device based on receiving the further advertising message on the second frequency band 506.

The method of flowchart 500 may further include re-transmitting the plurality of data packets to the peripheral device after transmitting the second connection indication message. The method of flowchart 500 may further include receiving a response from the peripheral device in response to one or more of the re-transmitted plurality of data packets and establishing a successful connection with the peripheral device. The method of flowchart 500 may further include setting a timer for scanning the second frequency band for the further advertising message from the peripheral device. The method of flowchart 500 may further include delaying a transmission of a disconnection complete event message to the host until at least after failing to receive a response from the peripheral device in response to one or more of the re-transmitted plurality of data packets or expiration of the timer, where the disconnection complete event message indicates that a connection with the peripheral device was not successfully established. The method of flowchart 500 may further include selecting the second frequency band so it is different from the first frequency band based on one or more criteria, where the one or more criteria is a frequency offset of the second frequency with the first frequency. The method of flowchart 500 may further include re-attempting the connection with the peripheral device for a number of times up to a threshold.

Figure 6:
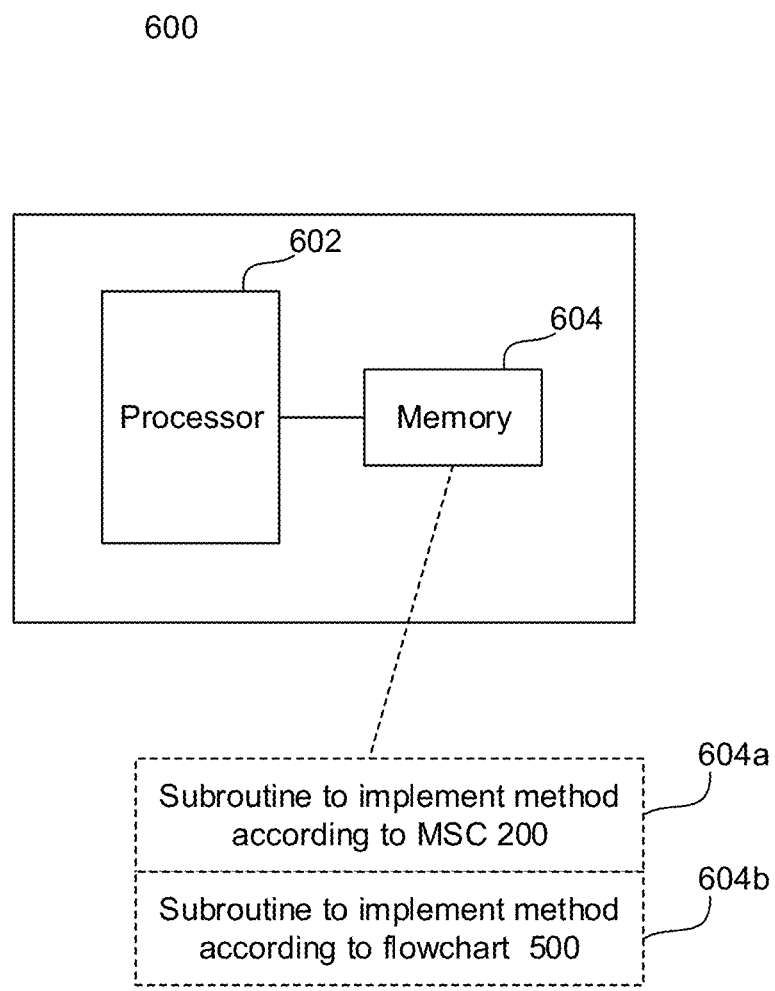
FIG. 6 exemplarily shows an internal diagram of a device with a processor and a memory according to the present disclosure.

FIG. 6 shows an internal configuration of a device 600 according to some aspects. As shown in FIG. 6, device 600 may be a Bluetooth controller and include processor(s) 602 and memory 604. Processor(s) 602 may be a single processor or multiple processors and may be configured to retrieve and execute program code to perform the methods described herein. For example, processor(s) 602 may transmit and receive data over a software-level connection.

Memory 604 may be a non-transitory computer readable medium storing sub-routine instructions 604a and 604b. Memory 604 may be a single memory or may be multiple memories and may be included as internal memories to processor(s) 602 or may be external to processor(s) 602. For example, the group of subroutines 604a-604b may provide instructions to the processor(s) to perform the methods of MSC 200 and/or flowchart 500 and its corresponding description.

Figure 7:
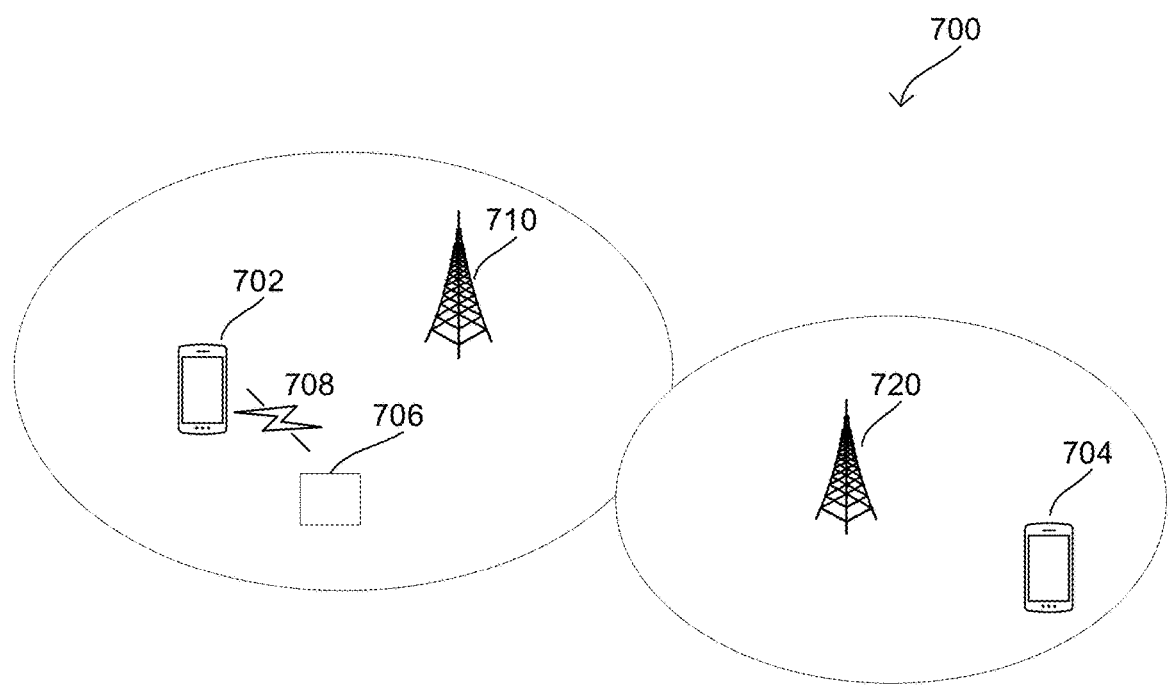
FIG. 7 exemplarily shows a network according to the present disclosure.
Figure 8:
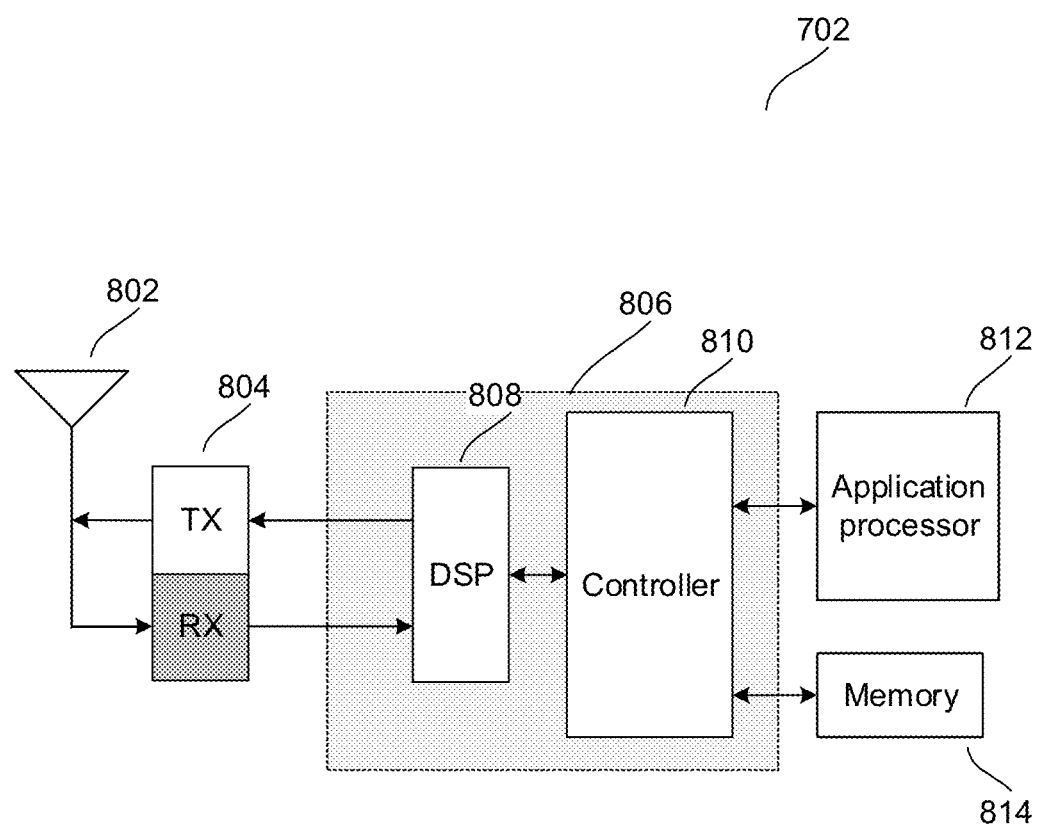
FIG. 8 exemplarily shows an internal configuration of terminal device according to the present disclosure.

FIGS. 7 and 8 depict an exemplary network and device architecture for wireless communications. In particular, FIG. 7 shows exemplary radio communication network 700 according to some aspects, which may include terminal devices 702 and 704, network access nodes 710 and 720, and peripheral device 706. Radio communication network 700 may communicate with terminal devices 702 and 704 via network access nodes 710 and 720 over a radio access network. Although certain examples described herein may refer to a particular radio access network context (e.g., 5G, LTE, UMTS, GSM, other 3rd Generation Partnership Project (3GPP) networks, WLAN/Wi-Fi, Bluetooth, etc.), these examples are demonstrative and may therefore be readily applied to any other type or configuration of radio access network. The number of network access nodes and terminal devices in radio communication network 700 is exemplary and is scalable to any amount.

In an exemplary cellular context, network access nodes 710 and 720 may be base stations (e.g., gNodeBs, eNodeBs, or any other type of base station), while terminal devices 702 and 704 may be cellular terminal devices (e.g., Mobile Stations (MSs), User Equipments (UEs), or any type of cellular terminal device). Network access nodes 710 and 720 may therefore interface (e.g., via backhaul interfaces) with a cellular core network such as an Evolved Packet Core (EPC, for LTE) or other cellular core networks, which may also be considered part of radio communication network 700. The cellular core network may interface with one or more external data networks. In an exemplary short-range context, network access node 710 and 720 may be access points (APs, e.g., WLAN or Wi-Fi APs), while terminal device 702 and 704 may be short range terminal devices (e.g., stations (STAs)). Network access nodes 710 and 720 may interface (e.g., via an internal or external router) with one or more external data networks.

The radio access network and core network (if applicable, such as for a cellular context) of radio communication network 700 may be governed by communication protocols that can vary depending on the specifics of radio communication network 700. Such communication protocols may define the scheduling, formatting, and routing of both user and control data traffic through radio communication network 700, which includes the transmission and reception of such data through both the radio access and core network domains of radio communication network 700. Accordingly, terminal devices 702 and 704, peripheral device 706, and network access nodes 710 and 720 may follow the defined communication protocols to transmit and receive data over the radio access network domain of radio communication network 1200, while the core network may follow the defined communication protocols to route data within and outside of the core network. Exemplary communication protocols include 5G/New Radio (NR), LTE, UMTS, GSM, WiMAX, Bluetooth, Wi-Fi, etc., any of which may be applicable to radio communication network 700.

For example, terminal device 702 may be a mobile phone, laptop, PC, or the like and be configured to pair with peripheral device 706 via a Bluetooth or other Low-Energy wireless link.

FIG. 8 shows an internal configuration of terminal device 702 according to some aspects, which may include antenna system 802, radio frequency (RF) transceiver 804, baseband modem 806 (including digital signal processor 808 and protocol controller 810), application processor 812, and memory 814. Although not explicitly shown in FIG. 8, in some aspects terminal device 702 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 702 may transmit and receive radio signals on one or more radio access networks. Baseband modem 806 may direct such communication functionality of terminal device 702 according to the communication protocols associated with each radio access network and may execute control over antenna system 802 and RF transceiver 804 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 702 shown in FIG. 8 depicts only a single instance of such components.

Terminal device 702 may transmit and receive wireless signals with antenna system 802, which may be a single antenna or an antenna array that includes multiple antennas. In the receive (RX) path, RF transceiver 804 may receive analog radio frequency signals from antenna system 802 and perform analog and digital RF front-end processing on the analog radio frequency signals to produce digital baseband samples (e.g., In-Phase/Quadrature (IQ) samples) to provide to baseband modem 806. RF transceiver 804 may include analog and digital reception components including amplifiers (e.g., Low Noise Amplifiers (LNAs)), filters, RF demodulators (e.g., RF IQ demodulators)), and analog-to-digital converters (ADCs), which RF transceiver 804 may utilize to convert the received radio frequency signals to digital baseband samples. In the transmit (TX) path, RF transceiver 804 may receive digital baseband samples from baseband modem 806 and perform analog and digital RF front-end processing on the digital baseband samples to produce analog radio frequency signals to provide to antenna system 802 for wireless transmission. RF transceiver 804 may thus include analog and digital transmission components including amplifiers (e.g., Power Amplifiers (PAs), filters, RF modulators (e.g., RF IQ modulators), and digital-to-analog converters (DACs), which RF transceiver 804 may utilize to mix the digital baseband samples received from baseband modem 806 and produce the analog radio frequency signals for wireless transmission by antenna system 802. In some aspects baseband modem 806 may control the radio transmission and reception of RF transceiver 804, including specifying the transmit and receive radio frequencies for operation of RF transceiver 804.

As shown in FIG. 8, baseband modem 806 may include digital signal processor 808, which may perform physical layer (PHY, Layer 1) transmission and reception processing to, in the transmit path, prepare outgoing transmit data provided by protocol controller 810 for transmission via RF transceiver 804, and, in the receive path, prepare incoming received data provided by RF transceiver 804 for processing by protocol controller 810. Digital signal processor 808 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 808 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 808 may include one or more processors configured to retrieve and execute program code that defines control and processing logic for physical layer processing operations. In some aspects, digital signal processor 808 may execute processing functions with software via the execution of executable instructions. In some aspects, digital signal processor 808 may include one or more dedicated hardware circuits (e.g., ASICs, FPGAs, and other hardware) that are digitally configured to specific execute processing functions, where the one or more processors of digital signal processor 808 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 808 may be realized as a coupled integrated circuit.

Terminal device 702 may be configured to operate according to one or more radio communication technologies, e.g., Bluetooth, among others. Digital signal processor 808 may be responsible for lower-layer processing functions (e.g., Layer 1/PHY) of the radio communication technologies, while protocol controller 810 may be responsible for upper-layer protocol stack functions (e.g., Data Link Layer/Layer 2 and/or Network Layer/Layer 3). Protocol controller 810 may thus be responsible for controlling the radio communication components of terminal device 702 (antenna system 802, RF transceiver 804, and digital signal processor 808) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 810 may be structurally embodied as a processor configured to execute protocol stack software (retrieved from a controller memory) and subsequently control the radio communication components of terminal device 702 to transmit and receive communication signals in accordance with the corresponding protocol stack control logic defined in the protocol stack software. Protocol controller 810 may include one or more processors configured to retrieve and execute program code that defines the upper-layer protocol stack logic for one or more radio communication technologies, which can include Data Link Layer/Layer 2 and Network Layer/Layer 3 functions. Protocol controller 810 may be configured to perform both user-plane and control-plane functions to facilitate the transfer of application layer data to and from radio terminal device 702 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 810 may include executable instructions that define the logic of such functions.

In some aspects, terminal device 702 may be configured to transmit and receive data according to multiple radio communication technologies. Accordingly, in some aspects one or more of antenna system 802, RF transceiver 804, digital signal processor 808, and protocol controller 810 may include separate components or instances dedicated to different radio communication technologies and/or unified components that are shared between different radio communication technologies. For example, in some aspects protocol controller 810 may be configured to execute multiple protocol stacks, each dedicated to a different radio communication technology and either at the same processor or different processors. In some aspects, digital signal processor 808 may include separate processors and/or hardware accelerators that are dedicated to different respective radio communication technologies, and/or one or more processors and/or hardware accelerators that are shared between multiple radio communication technologies. In some aspects, RF transceiver 804 may include separate RF circuitry sections dedicated to different respective radio communication technologies, and/or RF circuitry sections shared between multiple radio communication technologies. In some aspects, antenna system 802 may include separate antennas dedicated to different respective radio communication technologies, and/or antennas shared between multiple radio communication technologies. Accordingly, while antenna system 802, RF transceiver 804, digital signal processor 808, and protocol controller 810 are shown as individual components in FIG. 8, in some aspects antenna system 802, RF transceiver 804, digital signal processor 808, and/or protocol controller 810 can encompass separate components dedicated to different radio communication technologies.

The word "exemplary" is used herein to mean "serving as an example, instance, or illustration." Any aspect or design described herein as "exemplary" is not necessarily to be construed as preferred or advantageous over other aspects or designs.

The words "plurality" and "multiple" in the description or the claims expressly refer to a quantity greater than one. The terms "group (of)," "set [of]" "collection (of)," "series (of)," "sequence (of)," "grouping (of)," etc., and the like in the description or in the claims refer to a quantity equal to or greater than one, i.e., one or more. Any term expressed in plural form that does not expressly state "plurality" or "multiple" likewise refers to a quantity equal to or greater than one. The terms "proper subset," "reduced subset," and "lesser subset" refer to a subset of a set that is not equal to the set, i.e., a subset of a set that contains less elements than the set.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which is described in further detail within this disclosure, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. The terms "terminal device" and "user device" may be used interchangeably.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. As used herein, a first radio communication technology may be different from a second radio communication technology if the first and second radio communication technologies are based on different communication standards.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may be generally referred to herein as "cellular" communication technologies.

The terms "radio communication network" and "wireless network" as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The following examples pertain to further aspects of this disclosure:

Example 1 is a device including a processor configured to: transmit a connection indication message to a peripheral device and a connection complete event message to a host processor in response to receiving an advertising message from the peripheral device on a first frequency band; transmit a plurality of data packets to the peripheral device after the connection indication message; and based on receiving no response from the peripheral device in response to the plurality of data packets, re-attempt a connection with the peripheral device including: initiating a scan of a second frequency band for a further advertising message from the peripheral device, and transmitting a second connection indication message to the peripheral device based on receiving the further advertising message on the second frequency band.

In Example 2, the subject matter of Example(s) 1 may include where re-attempting the connection with the peripheral device further includes re-transmitting the plurality of data packets to the peripheral device after transmitting the second connection indication message.

In Example 3, the subject matter of Example(s) 2 may include where re-attempting the connection with the peripheral device further includes receiving a response from the peripheral device in response to one or more of the re-transmitted plurality of data packets.

In Example 4, the subject matter of Example(s) 1-3 may include where re-attempting the connection with the peripheral device includes setting a timer for scanning the second frequency band for the further advertising message from the peripheral device.

In Example 5, the subject matter of Example(s) 1-4 may include where the processor is configured to delay a transmission of a disconnection complete event message to the host processor until at least after failing to receive a response from the peripheral device in response to one or more of the re-transmitted plurality of data packets or expiration of the timer, where the disconnection complete event message indicates that a connection with the peripheral device was not successfully established.

In Example 6, the subject matter of Example(s) 1-5 may include where the second frequency band is different than the first frequency band.

In Example 7, the subject matter of Example(s) 1-6 may include where the processor is configured to select the second frequency band based on one or more criteria.

In Example 8, the subject matter of Example(s) 7 may include where the one or more criteria includes a frequency offset of the second frequency with the first frequency.

In Example 9, the subject matter of Example(s) 7-8 may include where the one or more criteria includes considerations of potential interference with another radio access technology (RAT).

In Example 10, the subject matter of Example(s) 9 may include where the other RAT is wireless local area network (WLAN) RAT.

In Example 11, the subject matter of Example(s) 1-10 may include where the processor is configured to re-attempt the connection with the peripheral device for a number of times up to a threshold.

In Example 12, the subject matter of Example(s) 11 may include where upon reaching the threshold, the processor is configured to transmit a disconnection complete event message to the host processor indicating that a connection with the peripheral device was not successfully established.

In Example 13, the subject matter of Example(s) 1-12 may include where the peripheral device is a Bluetooth-enabled device configured to transmit advertising messages on a plurality of frequency bands including the first frequency band and the second frequency band.

In Example 14, the subject matter of Example(s) 1-13 may include where the advertising message and the further advertising message are received from the peripheral device on one of three frequency bands including the first frequency band and the second frequency band.

In Example 15, the subject matter of Example(s) 14 may include where the three frequency bands are a 2402 MHz frequency band, a 2426 MHz frequency band, and a 2480 MHz frequency band.

In Example 16, the subject matter of Example(s) 1-15 may include where the processor configured to perform a scan of the first frequency band prior to receiving the advertising message from the peripheral device on the first frequency band.

In Example 17, the subject matter of Example(s) 16 may include where the processor configured to initiate the scan of the first frequency band in response to receiving a command to create a connection with the peripheral device from the host processor.

In Example 18, the subject matter of Example(s) 1-17 may include where the device is a Bluetooth controller.

In Example 19, the subject matter of Example(s) 18 may include where the Bluetooth controller includes Bluetooth radio integrated circuit (IC) circuitry and/or Bluetooth baseband processing circuitry.

Example 20 is a device including: means to transmit a connection indication message to a peripheral device and a connection complete event message to a host processor in response to receiving an advertising message from the peripheral device on a first frequency band; means to transmit a plurality of data packets to the peripheral device after the connection indication message; and based on receiving no response from the peripheral device in response to the plurality of data packets, means to re-attempt a connection with the peripheral device including: means to initiate a scan of a second frequency band for a further advertising message from the peripheral device, and means to transmit a second connection indication message to the peripheral device based on receiving the further advertising message on the second frequency band.

Example 21 is a method including: transmitting a connection indication message to a peripheral device and a connection complete event message to a host processor in response to receiving an advertising message from the peripheral device on a first frequency band; transmitting a plurality of data packets to the peripheral device after the connection indication message; and based on receiving no response from the peripheral device in response to the plurality of data packets, re-attempting a connection with the peripheral device including: initiating a scan of a second frequency band for a further advertising message from the peripheral device; and transmitting a second connection indication message to the peripheral device based on receiving the further advertising message on the second frequency band.

In Example 22, the subject matter of Example(s) 21 may include where re-attempting the connection with the peripheral device further includes re-transmitting the plurality of data packets to the peripheral device after transmitting the second connection indication message.

In Example 23, the subject matter of Example(s) 22 may include where re-attempting the connection with the peripheral device further includes receiving a response from the peripheral device in response to one or more of the re-transmitted plurality of data packets and establishing a successful connection with the peripheral device.

In Example 24, the subject matter of Example(s) 21-23 may include where re-attempting the connection with the peripheral device includes setting a timer for scanning the second frequency band for the further advertising message from the peripheral device.

In Example 25, the subject matter of Example(s) 21-24 may include delaying a transmission of a disconnection complete event message to the host processor until at least after failing to receive a response from the peripheral device in response to one or more of the re-transmitted plurality of data packets or expiration of the timer, where the disconnection complete event message indicates that a connection with the peripheral device was not successfully established.

In Example 26, the subject matter of Example(s) 21-25 may include where the second frequency band is different than the first frequency band.

In Example 27, the subject matter of Example(s) 21-26 may include selecting the second frequency band based on one or more criteria.

In Example 28, the subject matter of Example(s) 27 may include where the one or more criteria includes a frequency offset of the second frequency with the first frequency.

In Example 29, the subject matter of Example(s) 27-28 may include where the one or more criteria includes considerations of potential interference with frequency bands of other radio access technologies.

In Example 30, the subject matter of Example(s) 21-29 may include re-attempting the connection with the peripheral device for a number of times up to a threshold.

In Example 31, the subject matter of Example(s) 30 may include where upon reaching the threshold, the method includes transmitting a disconnection complete event message to the host processor indicating that a connection with the peripheral device was not successfully established.

In Example 32, the subject matter of Example(s) 21-31 may include executing the method at a Bluetooth controller.

In Example 33, the subject matter of Example(s) 21-32 may include where the peripheral device is a Bluetooth device configured to transmit advertising messages on a plurality of frequency bands including the first frequency band and the second frequency band.

In Example 34, the subject matter of Example(s) 21-33 may include where the advertising message and the further advertising message are received from the peripheral device on one of three frequency bands including the first frequency band and the second frequency band.

In Example 35, the subject matter of Example(s) 34 may include where the three frequency bands are a 2402 MHz frequency band, a 2426 MHz frequency band, and a 2480 MHz frequency band.

In Example 36, the subject matter of Example(s) 21-35 may include including performing a scan of the first frequency band prior to receiving the advertising message from the peripheral device on the first frequency band.

In Example 37, the subject matter of Example(s) 36 may include initiating the scan of the first frequency band in response to receiving a command to create a connection with the peripheral device from the host processor.

Example 38 is one or more non-transitory readable media storing instructions thereon that, when executed by a processor of a device, cause the processor to perform the method or realize a device of Examples 1-37.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections, and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A device comprising a processor configured to:
transmit a connection indication message to a peripheral device and a connection complete event message to a host processor in response to receiving an advertising message from the peripheral device on a first frequency band;
transmit a plurality of data packets to the peripheral device after the connection indication message; and
based on receiving no response from the peripheral device in response to the plurality of data packets, re-attempt a connection with the peripheral device comprising:
initiating a scan of a second frequency band for a further advertising message from the peripheral device; and
transmitting a second connection indication message to the peripheral device based on receiving the further advertising message on the second frequency band.

2. The device of claim 1, wherein re-attempting the connection with the peripheral device further comprises re-transmitting the plurality of data packets to the peripheral device after transmitting the second connection indication message.

3. The device of claim 2, wherein re-attempting the connection with the peripheral device further comprises receiving a response from the peripheral device in response to one or more of the re-transmitted plurality of data packets.

4. The device of claim 1, wherein re-attempting the connection with the peripheral device comprises setting a timer for scanning the second frequency band for the further advertising message from the peripheral device.

5. The device of claim 4, wherein the processor is configured to delay a transmission of a disconnection complete event message to the host processor until at least after failing to receive a response from the peripheral device in response to one or more of the re-transmitted plurality of data packets or expiration of the timer, wherein the disconnection complete event message indicates that a connection with the peripheral device was not successfully established.

6. The device of claim 1, wherein the second frequency band is different than the first frequency band.

7. The device of claim 1, wherein the processor is configured to select the second frequency band based on one or more criteria.

8. The device of claim 7, wherein the one or more criteria comprises a frequency offset of the second frequency with the first frequency.

9. The device of claim 7, wherein the one or more criteria comprises considerations of potential interference with another radio access technology (RAT).

10. The device of claim 9, wherein the other RAT is wireless local area network (WLAN) RAT.

11. The device of claim 1, wherein the processor is configured to re-attempt the connection with the peripheral device for a number of times up to a threshold.

12. The device of claim 11, wherein upon reaching the threshold, the processor is configured to transmit a disconnection complete event message to the host processor indicating that a connection with the peripheral device was not successfully established.

13. The device of claim 1, wherein the peripheral device is a Bluetooth-enabled device configured to transmit advertising messages on a plurality of frequency bands comprising the first frequency band and the second frequency band.

14. The device of claim 1, wherein the advertising message and the further advertising message are received from the peripheral device on one of three frequency bands comprising the first frequency band and the second frequency band.

15. The device of claim 14, wherein the three frequency bands are a 2402 MHz frequency band, a 2426 MHz frequency band, and a 2480 MHz frequency band.

16. The device of claim 1, the processor configured to perform a scan of the first frequency band prior to receiving the advertising message from the peripheral device on the first frequency band.

17. The device of claim 16, wherein the processor configured to initiate the scan of the first frequency band in response to receiving a command to create a connection with the peripheral device from the host processor.

18. A method comprising:
transmitting a connection indication message to a peripheral device and a connection complete event message to a host processor in response to receiving an advertising message from the peripheral device on a first frequency band;
transmitting a plurality of data packets to the peripheral device after the connection indication message; and
based on receiving no response from the peripheral device in response to the plurality of data packets, re-attempting a connection with the peripheral device comprising:
initiating a scan of a second frequency band for a further advertising message from the peripheral device; and
transmitting a second connection indication message to the peripheral device based on receiving the further advertising message on the second frequency band.

19. The method of claim 18, wherein re-attempting the connection with the peripheral device further comprises re-transmitting the plurality of data packets to the peripheral device after transmitting the second connection indication message.

20. The method of claim 18, further comprising selecting the second frequency band based on one or more criteria, wherein the one or more criteria comprises a frequency offset of the second frequency with the first frequency.

* * * * *